March 23, 1954
C. E. HUTCHINSON
2,672,987
AQUARIUM CLEANING DEVICE
Filed June 19, 1950
2 Sheets-Sheet 1
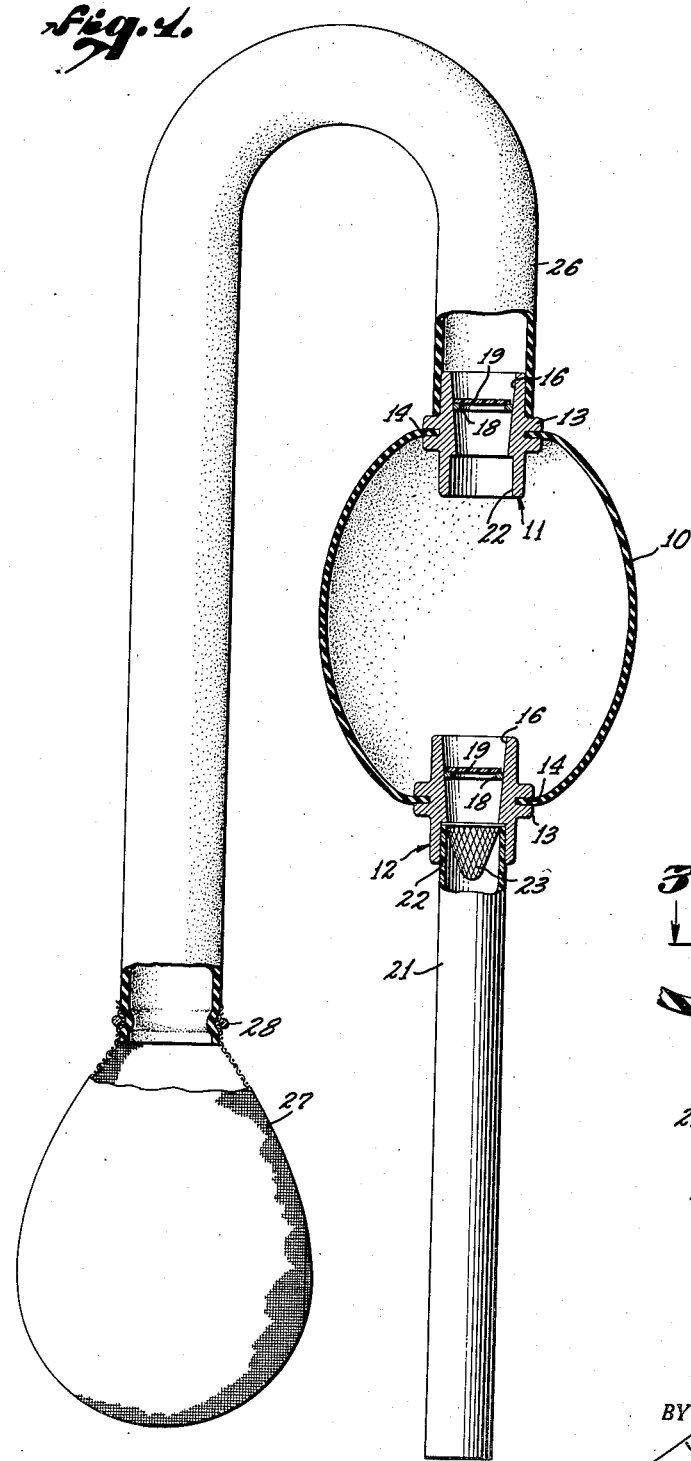
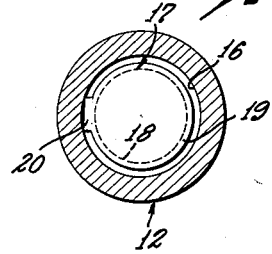
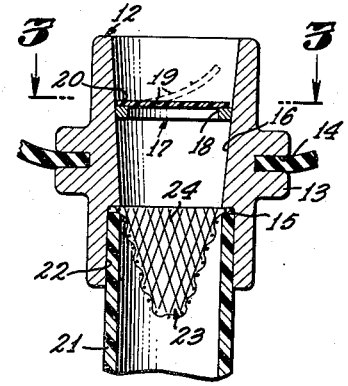
CLYDE E. HUTCHINSON,
INVENTOR.
BY George J. Smyth
ATTORNEY.

March 23, 1954 — C. E. HUTCHINSON — 2,672,987
AQUARIUM CLEANING DEVICE
Filed June 19, 1950 — 2 Sheets-Sheet 2
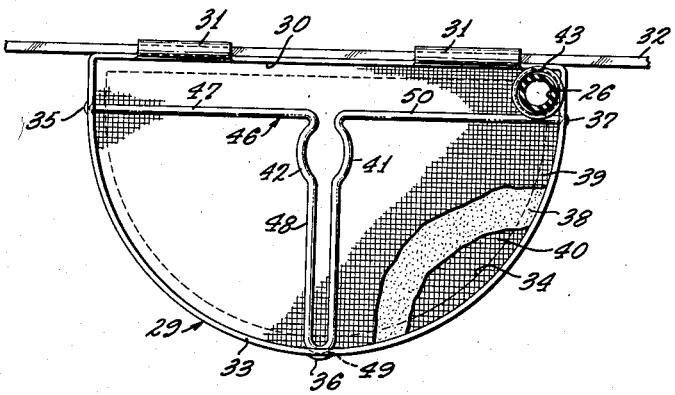
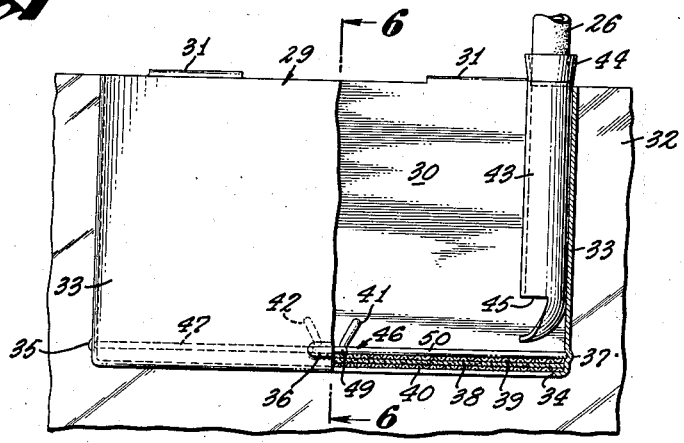
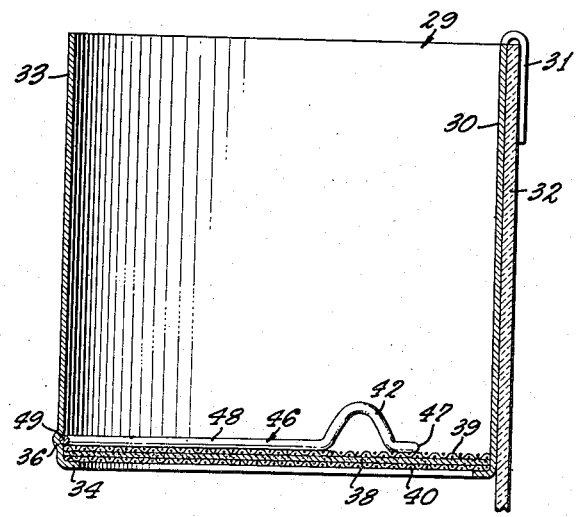
CLYDE E. HUTCHINSON,
INVENTOR.
ATTORNEY.

Patented Mar. 23, 1954

2,672,987

UNITED STATES PATENT OFFICE 2,672,987

AQUARIUM CLEANING DEVICE

Clyde E. Hutchinson, Venice, Calif.

Application June 19, 1950, Serial No. 169,056

10 Claims. (Cl. 210—207)

My invention relates to a cleaning device for the interiors of vessels holding liquids for prolonged periods, and is particularly designed for keeping the water in aquariums and the bottoms thereof in clean condition.

Small glass walled aquariums in which ornamental species of fish of miniature size are kept are in wide use for their decorative value and the proper care of such fish necessitates the frequent cleaning of the water and bottom of the aquarium to remove fragments of fish food, plants, and other detritus of small particles which accumulates on the bottom of the aquarium and would foul the water if allowed to remain for any considerable period of time.

An object of my invention is to provide a manually operable device by which water of the aquarium in which detritus of any character has accumulated may be sucked into the device and discharged back into the aquarium through filtering means effective to remove the particles of detritus from the returned water.

Another object of my invention is to provide a coarse mesh filter in a device of the kind described which is effective to prevent the entry into the device of particles large enough to interfere with the proper functioning of the device.

A further object of the invention is to provide a cleaning device of the kind described in which fine filter means are provided which may be readily removed from the device for cleaning purposes.

A still further object of the invention is to provide a cleaning device having valves operative to ensure one way flow of fluid through the device, the valves being very simple in arrangement and very easy of installation.

Another object of my invention is to provide fine filtering means for a cleaning device of the kind described, which filtering means may be supported on a wall of the aquarium and may be readily attached, when required for use, to the cleaning device.

Yet another object of my invention is to provide an improved fine filter unit for use with a cleaning device of the kind described, the filter unit being provided with a pad of material such as felted glass fibers, removably arranged in a shell to enable the pad to be readily cleaned when required.

Still further objects and features of my invention will hereinafter appear from a study of the following description read in conjunction with the accompanying drawings, in which:

Figure 1 is a general view of the aquarium cleaning device of my invention, with parts shown in section;

Figure 2 is a fragmentary longitudinal cross section through valve structure shown partly in section in Figure 1, the figure being drawn on a larger scale;

Figure 3 is a cross section on the line 3—3 of Figure 2;

Figure 4 is a front elevation of a modified form of strainer for the water sucked up from the tank and discharged thereinto by the device;

Figure 5 is a plan view of the strainer shown in Figure 4; and

Figure 6 is a section taken along line 6—6 of Figure 5.

The cleaning device of the present invention, referring now to Figure 1, comprises a bulb of resilient rubber providing a collapsible chamber, the bulb being alternately manually squeezed to reduce the volume of the chamber and allowed to regain its original volume due to the resiliency of the rubber walls. The bulb 10 is formed with two openings, the defining edge of each being engaged in valve housing and tube connector means 11 and 12. The valve housings are preferably identical in form, each comprising a rigid body member of tubular form having intermediate the ends thereof an outwardly projecting annular flange 13. The flange 13 of each housing is provided with a groove 14 sufficiently deep and of a configuration to form a substantially liquid tight seal with the defining edge of the opening in the bulb in which the valve housing is inserted.

The diameter of the bore of each of the valve housings 11 and 12 is increased for a short distance inwardly from one end to provide a shoulder 15 at the inner end of the increased diameter bore. The remainder of the bore of the valve housing is given a slight outward taper from the portion of least inside diameter toward the opposite end of the housing, as indicated at 16, for ease of assembly as will later appear.

The valve structure 17 comprises an annular seat 18, the outer periphery of which is preferably tapered to fit the tapered portion 16 of the bore of the valve housing. The outer diameter of the seat is less than that of the wider end of the tapered bore and greater than that of the narrower end of the tapered bore, so that a seat may be securely jammed in position in the tapered portion of the bore in each valve housing. It is to be noted that the wider end of the tapered portion of the bore of the valve housing 12 is directed toward the inside of the bulb. The wider end of the tapered portion of the bore of the valve housing 11, on the other hand, is directed away from the bulb 10.

The non-return valves are formed of discs 19 of thin resilient material, such as a suitable plastic provided, in the illustrated embodiment of the invention, at one point with a radially projecting tab 20 which is secured in any suitable way to the wide face of the seat 18, as shown in Figure 3, as for instance by a suitable bonding material. The disc 19 is of slightly less diameter than the outer diameter of the seat so that, in response to flow in one direction, it may deflect upwardly from the tab 20, but yet will securely engage the seat to close the passage therethrough to prevent flow in the reverse direction. Due to the small back pressures in the operation of the device, I have found valves constructed and installed as described very satisfactory and long-lasting.

A suction tube 21 is formed from a piece of tubing of preferably rigid material, such as a suitable plastic, and may be merely pressed into the cylindrical portion 22 of the bore of the valve housing 12 although, if preferred, other means could be used to mount the tube to the valve mount.

In order to prevent snails, small pebbles or relatively large pieces of debris, such as small dead fish, from being sucked into and perhaps jamming the suction valve, that is, the valve carried by the housing 12, or if drawn into the bulb 10, from jamming the non-return valve of the housing 11, I prefer to install a relatively coarse mesh filter 23 ahead of the suction valve. As shown in Figure 2, the filter 23 is preferably formed of a relatively large mesh wire screen 24 of cone shape, the base of which is secured to a ring 25 or flared outwardly to form an annular mounting member which is clamped between the end of the tube 21 and the shoulder 15 of the valve housing 12.

The delivery or return tube 26 is formed from a length of flexible tubing telescopically fitted over the outwardly projecting portion of the valve housing 11. The opposite end of the tube 26 is fitted with fine filtering means which may comprise a strainer 27 of fine wire mesh, or a fabric, such as cotton cloth, formed as a small bag, the neck of which may be secured to the tube 26 by some clamping means, such as a length of string 28 or a tightly stretched rubber band. By untying the string or working the rubber band off the end of the tube 26, the strainer 27 may be removed, turned inside out and washed clean. The strainer may be, and usually is, left in the water of the aquarium while dirty water sucked into the bulb is discharged again into the water in the aquarium freed from the suspended dirt which is retained in the strainer 27.

The modified form of strainer unit shown in Figures 4, 5, and 6 is designed to be suspended on the wall of an aquarium and may be left in position when not in use, thus avoiding having to dry and store the fabric type of strainer and so may be preferred by some users.

The strainer unit 29 comprises a metal or plastic shell preferably semicircular in plan view as shown in Figure 5. The straight or back wall 30 may be provided with a pair of bent over clips 31 integral with, soldered, or otherwise secured to the back wall, and adapted to be supported on the wall 32 of an aquarium. The bottom edge of the back wall 30 and front wall 33 are, in the illustrated embodiment of the invention, inwardly turned to provide an inwardly projecting peripheral flange 34, but the bottom of the shell is open otherwise. At points 35, 36, and 37 spaced around the shell at a predetermined distance above the bottom edge thereof, outwardly directed depressions are formed of generally semispherical shape and of small radius for a purpose later explained.

A filter unit is cut closely in the bottom of the shell of the strainer and, as shown in Figure 6, is formed of an integrated pad of felted fibers 38, preferably of glass fibers, stiffened by cut out pieces of wire or plastic screen elements 39 and 40, placed respectively above and below the filter pad, and supported by the flange 34. If desired, the shell can be formed with a perforated lower wall, in which case the lower screen element 40 can be eliminated.

The filtering unit is held firmly against the inwardly turned flange 34, or the perforated lower wall if the latter is used, by a length of stiff wire 46 forming a retainer. One end of the wire is positioned in recess 35, the first length 47 of the wire extending from the recess toward the center of the filter pad, a second length 48 then being looped at right angles toward the front of the shell, the tip 49 of the loop being located in the depression 36, and a third length 50 of the wire thereafter being bent in line with the first length of wire and the end of the wire being located in the depression 37.

At the junction of the first and third lengths of wire with the looped second section, the wire is looped upwardly as shown at 41 and 42, the loops being bent away from one another. The filter pad assembly is kept firmly pressed against the peripheral bottom flange 34 while the wire retainer is engaged with the recesses in the filter shell walls, but by squeezing loops 41 and 42 together, the ends of the wire may be freed from the recesses 35 and 37 and the retainer then withdrawn, after which the filter assembly may be removed for cleaning.

A length of tube 43 is secured to the wall of the strainer, and preferably at the jointure between the back and front walls. The upper end 44 projects sufficiently far above the strainer shell to enable the free end of the tube 26 to be pushed onto it. The lower end of the tube 43 is cut away on one side as shown at 45, and the uncut side is bent forward in order to spread the dirty water delivered by the tube 26 over the top of the filter pad. When the cleaning operation is finished, the tube 26 is merely pulled free from the tube 43, the filter pad washed and put back.

In using the device of my invention to clean an aquarium of the sizes in common use, the bulb 10 is merely held in one hand and intermittently squeezed and relaxed as the suction tube 21 is moved over the bottom and wherever detritus may be located; the user's other hand being free if necessary to hold the tube 26 out of the way. As the bulb 10 is collapsed, the outrush of air tightly seats the valve of the housing 12 while the valve of the housing 11 is forced open. When the bulb is allowed to expand, the air entering the bulb through the housing 11 results in a closure of the valve thereof and consequently a partial vacuum is formed within the bulb. This vacuum, as should be obvious now, results in water being forced by atmospheric pressure up through the tube 21 and into the bulb. As the bulb is again collapsed, the suction valve is closed and the water held by the bulb is forced into the tube 26.

Thus the intermittent collapsing and expanding from the collapsed condition of the bulb will act to suck water into the bulb and force it into the tube 26 and through the strainer 27 or the strainer unit 29, either of which will retain the detritus held by the water while permitting the cleaned water to flow back into the aquarium.

The "suction" developed by the bulb is sufficient to draw the gravel, small pebbles, or like material, usually furnished aquariums, up into the suction tube 21 to thoroughly clean the same even as the accumulation of food, et cetera, is being forced up into the device and through the strainer member used. As larger fragments of gravel and pebbles cannot pass the filter 23, there is no danger of the same jamming the valves 19. If smaller particles of sand and gravel should pass the filter 23, there is little likelihood of these finer particles affecting the valves as they are formed of resilient material and will tend to seat properly even though foreign particles are held by the respective valve seats. At each operation of collapsing the bulb, the gravel or pebbles will tend to fall by gravity back into the aquarium and as they tumble down the tube 21, they tend to cleanse themselves of any material clinging thereto.

Thus, the device of the present invention not only can be used to remove any loose particles of decaying matter fouling the water of the aquarium, but will, at the same time, tend to clean the gravel or pebbles lining the bottom of the aquarium.

If it is desired to clean the bulb, the strainer 23, or the valves, or replace the latter, it is only necessary to pull the suction tube 21 out of the valve housing and tube connector 12 and pull the tube 26 off of the valve housing 11, and free the valve housings from the bulb 10, which operation separates all of the component parts for individual attention. The manner in which the strainer units may be cleaned has been previously described.

It will be seen that I have provided a simple and effective cleaning device for filled aquariums which is adapted for manufacture at low cost and which may be kept clean with little trouble.

Although the now preferred embodiments of the present invention have been shown and described herein, it is to be understood that the invention is not to be limited thereto, for it is susceptible to changes in form and detail within the scope of the appended claims.

I claim:

1. A cleaning device for filled aquariums and the like, comprising: a resilient walled bulb; a tubular valve housing and tube connector member mounted liquid-tight in an opening in the wall of said bulb, one end portion of the bore of said member presenting a cylindrical wall surface terminating in an annular shoulder; the opposite end portion of said bore flared outwardly toward the interior of said bulb; a coarse mesh screen of a diameter substantially equal to said cylindrical wall surface engaging said shoulder; a rigid suction tube force fitted into said cylindrical wall surface and holding said screen against said shoulder; an annular valve seat pressed into said flared portion of the bore of said member; a disc valve secured at one edge to said seat and effective to enable liquid from the suction tube to flow into said bulb and preventing reverse flow of the liquid; a return tube connected to said bulb; valve means effective to enable liquid to only flow from said bulb into said return tube and fine filtering means arranged at the outlet end of said return tube, whereby alternate compression and release of said bulb, when the suction tube is immersed in the liquid in the tank, is effective to circulate liquid through the device which liquid is initially filtered to prevent entry of coarse particles of debris into the device, and to separate fine particles of debris from the liquid flowing from the device.

2. A cleaning device for filled aquariums and the like, comprising: a resilient walled bulb; a tubular valve housing and tube connector member mounted liquid-tight in an opening in the wall of said bulb, said member having the outer end portion of its bore formed with a cylindrical wall, the opposite end portion of said bore being flared outwardly toward the interior of said bulb and an interior annular shoulder between said portions; a coarse mesh screen positioned in the parallel walled portion of said member against said shoulder; a rigid suction tube secured in said parallel walled portion of the valve housing and connector member and clamping said screen against the shoulder; a ring valve seat pressed into said flared portion of the member; a disc valve secured at one edge to said seat; a second valve housing and tube connector member secured in the wall of said bulb, and provided with a passage tapering outwardly from the interior of said bulb; a ring valve seat pressed into said flared portion of the second connector member; a disc valve secured at one edge to said seat and enabling liquid from said bulb to flow outward through the valve but preventing reverse flow of liquid; a liquid return tube connected to said second tube connector; and fine filtering means arranged at the outlet end of said return tube, whereby alternate compression and release of said bulb, when the suction tube is immersed in the liquid in the tank, is effective to circulate liquid through the device which liquid is initially filtered to prevent entry of coarse particles of debris into the device, and to separate fine particles of debris from the liquid flowing from the device.

3. A cleaning device as set forth in claim 2 and in which the fine filtering means arranged at the outlet end of the return tube comprise a bag of fine meshed material; and means detachably securing said bag over the open end of said tube.

4. A cleaning device as set forth in claim 2 and in which the fine filtering means arranged at the outlet end of the return tube comprise: a shell having an open top and an apertured bottom; means for suspending said shell on a wall of an aquarium, so that filtered liquid will flow from the filter thereinto; a pad of filtering material removably positioned in said shell; and means for detachably connecting the end of the return tube to the filter means to deliver liquid thereinto for filtering.

5. A cleaning device as set forth in claim 4 and in which the means detachably securing the pad of filtering material in the shell comprise: a retainer formed to lie against the upper surface of the pad of filtering material, said retainer having oppositely extending arms resiliently engaging with the shell and formed to enable the arms to be withdrawn from engagement with the shell to free the pad of filtering means for removal.

6. A cleaning device as set forth in claim 4 and in addition comprising a tube secured to said shell and having its outlet end formed to direct liquid over the top of the pad of filtering material, the end of the return tube being adapted to interfit with the inlet end of the tube secured to the shell.

7. A cleaning device as set forth in claim 2 and in which the fine filtering means arranged at the outlet end of the return tube comprise: a shell having an open top and an apertured bottom; means for suspending said shell on a wall of an aquarium so that filtered liquid will flow from the aquarium thereinto; a pad of felted glass fibers supported in said shell; means for removably retaining said pad in position in said shell; and means for detachably connecting the end of the return tube to the filter means.

8. A portable manually operated filtering and cleaning device for a filled aquarium comprising: a resilient walled bulb; an elongate suction tube of rigid material; means carried by one end of said bulb for removably connecting an end of said rigid tube thereto and communicating the tube with the interior of said bulb; said rigid tube adapted to be manually guided through the aquarium to move the free end of the tube over the floor of said aquarium; a flexible return tube having one end connected to said bulb at the end opposite the connection with said rigid tube and communicating with the interior of said bulb, the free end of said return tube to be disposed so that water flowing therefrom is returned to said aquarium; valve means carried within said bulb adjacent the end of the rigid tube enabling water flow from said tube into said bulb and preventing water flow from the bulb into said tube; valve means mounted adjacent the end of said flexible tube connected to said bulb enabling water flow from said bulb into said return tube and preventing water flow from said return tube into said bulb, whereby to circulate water expelled from said bulb through the flexible tube for return to said aquarium when the bulb is collapsed by external manual pressure, and drawn through the suction tube from the aquarium into the bulb when the bulb is free to return to its initial shape; a bag of fine mesh fabric; and means for removably securing said bag to the free end of said flexible return tube whereby foreign materials of the water are retained within the bag as the water drawn into the bulb and expelled from the latter into the flexible tube is returned to said aquarium.

9. A portable manually operated filtering and cleaning device for a filled aquarium comprising: a resilient walled bulb; an elongate suction tube of rigid material; means carried by one end of said bulb for removably connecting an end of said rigid tube thereto and communicating the tube with the interior of said bulb; said rigid tube adapted to be manually guided through the aquarium to move the free end of the tube over the floor of said aquarium; a flexible return tube having one end connected to said bulb at the end opposite the connection with said rigid tube thereby communicating said flexible tube with the interior of said bulb, the free end of said flexible tube to be disposed so that water flowing therefrom is returned to said aquarium; valve means carried within said bulb adjacent the end of the rigid tube, said valve means being normally closed and operative to prevent water flow from the bulb into said tube; second valve means mounted adjacent the end of said flexible tube connected to said bulb, said second valve means being normally closed and operative to prevent water flow from said return tube into said bulb both of said valve means being opened as the bulb is alternately collapsed and expanded whereby to circulate water expelled from said bulb through the flexible tube for return to said aquarium when the bulb is collapsed by external manual pressure and drawn through the suction tube from the aquarium into the bulb when the bulb is free to return to its initial shape; and a bag of fine mesh fabric removably secured to the free end of said flexible return tube for removing foreign materials from the water drawn into the bulb and expelled from the latter into the flexible tube for return to said aquarium.

10. A portable manually operated filtering and cleaning device for a filled aquarium comprising: a resilient walled bulb; an elongate suction tube of rigid material; means carried by one end of said bulb for removably connecting an end of said rigid tube thereto and communicating the tube with the interior of said bulb; said rigid tube adapted to be manually guided through the aquarium to move the free end of the tube over the floor of said aquarium; a flexible return tube having one end connected to said bulb at the end opposite the connection with said rigid tube and communicating with the interior of said bulb, the free end of said return tube to be disposed so that water flowing therefrom is returned to said aquarium; one way valve means carried within said bulb at opposite ends thereof for controlling the flow of water into and out of said bulb, one of said valve means enabling water flow from said rigid tube into said bulb and preventing water flow from the bulb into said tube; the other of said valve means enabling water flow from said bulb into said flexible tube and preventing water flow from said flexible tube into said bulb, whereby to circulate water expelled from said bulb through the flexible tube for return to said aquarium when the bulb is collapsed by external manual pressure and drawn through the suction tube from the aquarium into the bulb when the bulb is free to return to its initial shape; a bag of fine mesh fabric; and releasable means for compressively securing the mouth of said bag around the free end of said flexible tube whereby foreign materials held by said water forced into said flexible tube is entrapped in said bag prior to the return of the water to the aquarium, said releasable means permitting said bag to be removed from said flexible tube for ejecting foreign materials entrapped within said bag.

CLYDE E. HUTCHINSON.

References Cited in the file of this patent

UNITED STATES PATENTS

| Number | Name | Date |
|---|---|---|
| 218,366 | Champion | Aug. 12, 1879 |
| 598,115 | Robertson | Feb. 1, 1898 |
| 723,042 | Schwerin | Mar. 17, 1903 |
| 961,379 | Siebert, Jr. | June 14, 1910 |
| 1,041,378 | Tweedale | Oct. 15, 1912 |
| 1,063,468 | Pribil | June 3, 1913 |
| 1,352,306 | Mott | Sept. 7, 1920 |
| 2,293,051 | Duffy | Aug. 18, 1942 |
| 2,515,538 | Wall | July 18, 1950 |

FOREIGN PATENTS

| Number | Country | Date |
|---|---|---|
| 3476 | Australia | Aug. 25, 1926 |